United States Patent [19]

Chebra et al.

[11] Patent Number: 4,741,022
[45] Date of Patent: Apr. 26, 1988

[54] REMOTE SUBSCRIBER INTERACTION SYSTEM

[75] Inventors: Ronald J. Chebra, Mercerville; Alan Eisenberg, Marlboro; Rolland T. James, Collingswood, all of N.J.

[73] Assignee: Base 10 Telecom, Inc., Trenton, N.J.

[21] Appl. No.: 846,444

[22] Filed: Dec. 13, 1985

[51] Int. Cl.⁴ ........................................... H04M 11/04
[52] U.S. Cl. ..................................... 379/106; 379/39; 379/49; 379/50
[58] Field of Search ...................... 379/39 (U.S. only), 379/50 (U.S. only), 106 (U.S. only), 37, 42–45, 107, 49

[56] References Cited

U.S. PATENT DOCUMENTS

| | | | |
|---|---|---|---|
| 3,700,823 | 10/1972 | Chulak | 379/50 X |
| 4,442,320 | 4/1984 | James et al. | 379/50 X |
| 4,521,643 | 6/1985 | Dupuis et al. | 379/50 X |

FOREIGN PATENT DOCUMENTS

| | | | |
|---|---|---|---|
| 800176 | 11/1968 | Canada | 379/106 |
| WO85/04302 | 9/1985 | World Int. Prop. O. | 379/49 |

Primary Examiner—Keith E. George
Attorney, Agent, or Firm—Weiser & Stapler

[57] ABSTRACT

A central control unit (scanner) is connected across a set of subscriber loops. At each subscriber's premises, an individual subscriber terminal unit (STU) is connected across that particular subscriber's loop. To each STU are connected the various instrumentalities which are to be monitored by the system, e.g. fire alarms, burglar alarms, etc. FSK modulated signals in the upper part of the audible range are transmitted from the scanner to the STUs at appropriate times. The STUs reply by means of similar signals to indicate the status (e.g. alarm, or non-alarm) of the instrumentalities at the respective subscriber premises. This transmission and retransmission is interrupted when the subscriber's telephone is off-hook. In addition, a signal below the audible range (low tone) is produced at the STU, and transmitted to the scanner over the telephone loop when all the instrumentalities at the particular subscriber premises are in a given state (e.g. non-alarm). When the state of one instrumentality changes, low tone is stopped. Such stoppage is sensed by the scanner, and causes immediate transmission of the FSK signals from the scanner to the corresponding STU, even though the associated telephone is off-hook at the time. The reply to such transmission provides information about the reason for the stoppage, i.e. what is the source of the alarm.

23 Claims, 4 Drawing Sheets

REMOTE SUBSCRIBER INTERACTION SYSTEM

TECHNICAL FIELD

This invention relates to systems for utilizing telephone networks to provide additional functions, beyond those of traditional telephone service involving conversations between subscribers. More particularly, the invention relates to such systems in which the network is additionally used to monitor the conditions of one or more instrumentalities, located at the subscriber's premises.

The instrumentalities in question may be of various types. One type is a device for providing an electrical alarm signal when an abnormal condition is detected at the subscriber's premises. Such an abnormal condition may be a fire, an unauthorized entry, a malfunction of some machinery under surveillance, etc. Another type may be a device which provides an electrical signal indicative of the state of some equipment at the subscriber's premises, even though there is no abnormality. This could be utility meter readings, meteorolgical measurements, operational data of process equipment, etc. Still other types can be envisioned.

BACKGROUND ART

The present invention is by no means the first to deal with systems of this kind. Indeed, numerous such systems have previously been proposed. However, so far as the present inventors are informed, all such previously proposed systems had characteristics which detracted from their usefulness, or their desirability, in one way or another or were not adequate to meet the practical requirements of such systems.

For example, some prior systems proposals involved the use of auxiliary signals which are audible to the subscriber when using the telephone for conventional conversational purposes. This is not only disturbing to the subscriber, but also contravenes the technical restrictions imposed by some telephone companies, or governmental agencies.

Other such prior system proposals involved the use of auxiliary signals which were above the range of audible frequencies. However, this created electrical filtering requirements within the system itself, and possibly also within the conventional telephone network, which were difficult to implement, and also costly, to the point of impairing the economic acceptability of the system.

Still other system proposals, in an effort to overcome drawbacks such as noted above, simply sacrificed some desirable system functions, such as reliable surveillance of the equipment at the subscriber's premises, or the like.

One prior system with which the present inventors are quite familiar is described in U.S. application Ser. No. 327,486 filed on Dec. 4, 1981 and now U.S. Pat. No. 4,442,320. This patent is assigned to the same assignee as the present application.

In the system described in U.S. Pat. No. 4,442,320, a central control unit interrogates various instrumentalities located at a plurality of telephone subscriber premises and responses representative of the status of the instrumentalities are transmitted from the subscriber premises to the central control unit. Interrogation of the instrumentalities at a particular subscriber's premises is interrupted while the telephone of that subscriber is in use ("off-hook"). In order to maintain surveillance of these instrumentalities, a low tone signal, at a frequency below the audible range, is transmitted from the subscriber's premises to the central control unit while the telephone is in use and so long as all the monitored instrumentalities at the subscriber's premises are in given states (e.g. non-alarm). When a single instrumentality at a particular subscriber's premises changes state (e.g. alarm), the transmission of the low tone signal ceases and interrogation of all of the instrumentalities at these premises is resumed even though the telephone is in use and the interrogation signals are audible. A user of the telephone does not mind hearing the audible interrogation signals because they have been initiated by an apparent change of state of one of the monitored instrumentalities.

In the specific system described in U.S. Pat. No. 4,442,320, the absence of the low tone signal continues until the particular instrumentality which caused the interruption of the low tone signal returns to its initial state. As a result, interrogation of all the instrumentalities at the particular premises continues during an off-hook condition of the telephone even though all the necessary information about the particular instrumentality causing cessation of the low tone signal has been obtained.

Under certain circumstances, the continuous absence of the low tone signal and the resulting continuous interogation during an off-hook condition of the telephone can be undesirable. For example, not all changes in the state of an instrumentality signal emergency-type alarms and, therefore, the continuous transmission of interrogation signals in the audible range during an off-hook condition of the telephone is unnecessarily disturbing to the users of the telephone. Also, a system set to give interrogation priority to alarm conditions of any time will continue to give priority to a particular premises from which an alarm condition is indicated as represented by the continued absence of a low tone signal. In fact, once an alarm condition has been indicated and interrogation and response signals have been transmitted to identify the specific alarm condition, a further indication of the same alarm condition, as represented by a continued absence of a low tone signal, is unnecessary.

DISCLOSURE OF THE INVENTION

Accordingly, it is a principal object of the present invention to provide a new and improved system which cooperates with a conventional telephone network to provide additional functions, but in an improved manner as compared with previously proposed systems intended for the same general purpose.

It is another object of the present invention to provide such a system which lacks one or more of the shortcomings of previously proposed systems.

It is another object to provide such a system which does not use auxiliary signals that are audible to the subscriber during normal telephone usages.

It is another object to provide a system which does not rely on signals above the audible frequency range.

It is another object to provide a system which does not require special electrical filtering within the conventional telephone network.

It is another object to provide a system which provides a high degree of reliable surveillance of the equipment at the subscriber's premises.

These and other objects which will appear are accomplished in accordance with the present invention as follows.

At a point at which a group of subscriber loops to be served by the system is conveniently accessible, a central control unit (hereinafter called "scanner") is connected across all these subscriber loops. At each subscriber's premises, an individual electronic unit (hereinafter called "subscriber terminal unit" or "STU") is connected across that particular subscriber's loop.

To each STU, there are connected the various instrumentalities which are to be monitored by the system, so that their output signals are available in electrical form within the STU.

By means of suitable signals within the audible range, the scanner interrogates the STUs at appropriate times. The STUs reply by means of similar signals to indicate the status of the instrumentalities at the respective subscriber premises.

This normal pattern of interrogation and reply is limited to periods during which the subscriber's telephone is on-hook, i.e., when the subscriber is not using the telephone for conventional purposes, and ceases when the subscriber picks up the telephone (i.e. creates an off-hook condition).

A special signal at a frequency well below the audible range is also produced at the STU, and is transmitted to the scanner over the telephone loop, which of course also carries the other conventional telephone signals: voice, dial tone, ringing, busy tone, etc. This special signal (hereafter called "low tone") is preferably present continuously, during both on-and off-hook conditions, but only if all the instrumentalities at the particular subscriber premises are within their predetermined normal, or safe, range of states.

If any one or more of these instrumentalities depart from that range, i.e., assumes a state of danger or alarm, production of low tone within the STU is discontinued. Such discontinuance of low tone is sensed by the scanner, and causes immediate interrogation of the particular STU which is the source of this phenomenon, even though the associated telephone is off-hook, so that this STU would normally not be interrogated (or reply) at this time. The reply to such interrogation which is then produced by the STU provides information about the reason for the observed phenomenon, i.e. what is the source of the danger or alarm.

As previously noted, interrogation and reply take place within the audible frequency range, and are therefore superposed on any other use of the telephone during the off-hook condition, e.g. upon subscriber conversations. However, this occurs only in response to a danger or alarm indication. Therefore, it is not considered objectionable, nor is it prohibited by telephone regulations. Indeed, it actually has the desirable aspect of simultaneously alerting the telephone user to the situation.

Once the scanner has received a response so that the particular cause for change of state of the particular instrumentality has been identified, the scanner resets the STU to resume transmission of the low tone signal even though the instrumentality remains in the changed state. When another instrumentality changes state, the low tone signal is interrupted and the interrogation and response cycle is repeated to identify the particular instrumentality and the particular cause for the change of state of the instrumentality. Likewise, when an instrumentality which has changed it state returns to its initial condition, there is an interruption of the low tone signal until the scanner interrogates the STU and receives a response which indicates that the instrumentality has returned to its initial state.

Thus, in contrast to the specific system described in U.S. Pat. No. 4,442,320, in which the low tone signal is interrupted as long as a changed state continues, in the present invention the low tone signal is interrupted only until the particular changed state is identified and the low tone signal transmission resumes until any instrumentality connected to the STU changes from its prior condition as recorded by the scanner from prior interrogations and responses.

In the absence of a phenomenon such as described above, the scanner normally interrogates the individual STUs in a predetermined, cyclical sequence. However, other deviations from that sequence are preferably also provided. For example, when a particular STU is first activated as part of the system, it is preferably interrogated immediately, even though this may be out of its normal sequence, to determine the status of its associated instrumentalities without delay. Also, whenever a subscriber hangs up, the STU at that location is preferably immediately interrogated, even though low tone had not indicated a danger or alarm condition.

BRIEF DESCRIPTION OF DRAWINGS

For further details, reference is made to the discussion which follows, in light of the accompanying drawings wherein.

The same reference numerals designate similar elements in the different figures.

BEST MODE OF CARRYING OUT THE INVENTION

Figure 1:
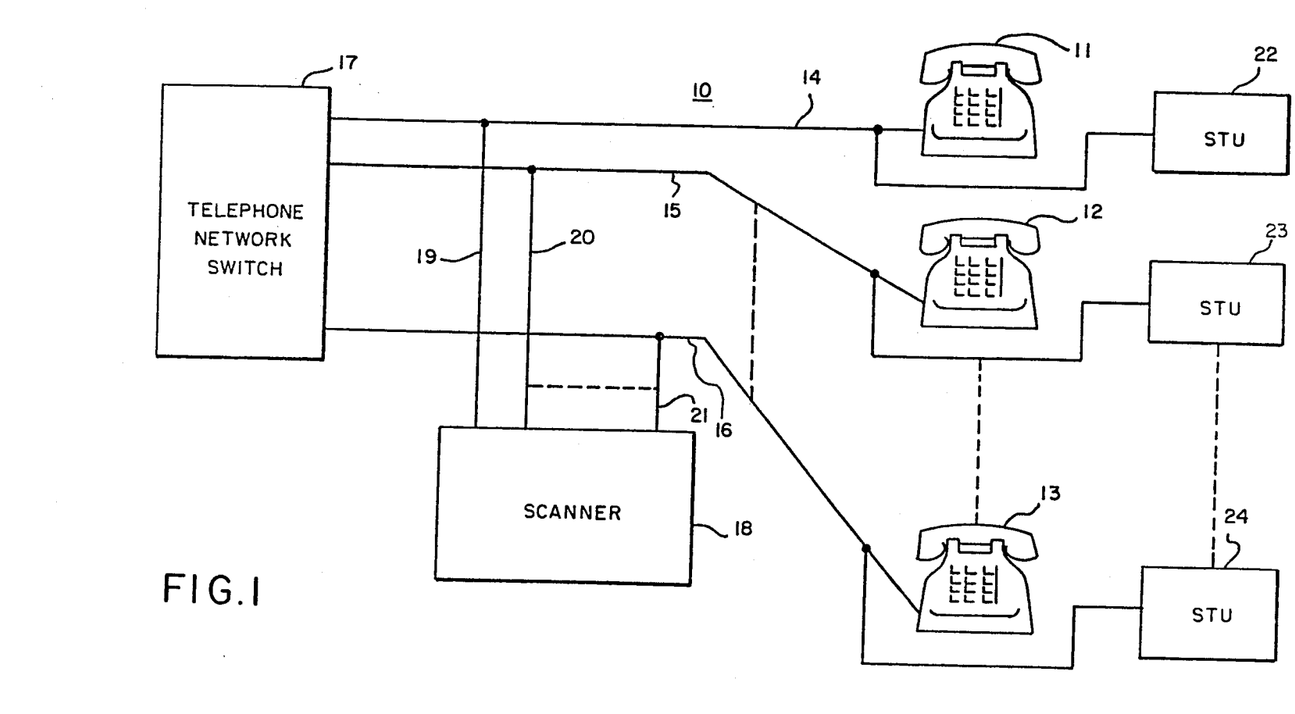
FIG. 1 is an over-all system block diagram of an embodiment of the invention.

Referring to FIG. 1, this shows a telephone network 10 which, in itself, is entirely conventional in all respects. Indeed it is one of the features of the present invention that it can be practiced using a conventional telephone network, without interfering with its operation in the slightest.

This network 10, which is shown in highly simplified form in FIG. 1, includes a plurality of subscriber telephone handsets, respectively designated by reference numerals 11, 12 and 13. Each of these handsets is connected to its own local telephone line, or loop. These are respectively designated by reference numerals 14, 15 and 6. These local lines, in turn, all lead to a switching system 17, normally located at the telephone central office. All of these elements of the system may take essentially any conventional form. The subscriber handsets 11, 12, 13 may be of the dial or pushbutton variety. The central office switch 17 may be of the rotary, or cross-bar, or even fully electronic variety. The local lines 14, 15, 16 may also be of any conventional variety, including repeaters, equalizers, etc., as appropriate, provided only they are capable of passing the low tone signals.

In accordance with the present invention, the system of FIG. 1 further includes a scanner 18. This scanner is preferably physically located at some point at which it can conveniently be connected to the various individual subscriber lines. This may be at the central office, where the switching equipment 17 is also located. In FIG. 1, connections 19, 20 and 21 are shown between the scanner 18 and the respective lines 14, 15 and 16. Further in accordance with the present invention, at each individual subscriber location, there is provided a separate subscriber terminal unit, abbreviated as STU, respectively designated by reference numerals 22, 23 and 24.

Attention is invited to the fact that equipment for only three subscribers is shown in FIG. 1. However, it should be understood that this is only for simplicity of illustration. The invention is intended to be used with larger numbers of subscribers, in which case the handsets, the connections and the STUs would all be correspondingly increased in numbers. This is symbolically indicated in FIG. 1 by widespaces bridged by broken lines, between all the foregoing elements of the overall system.

Figure 2:
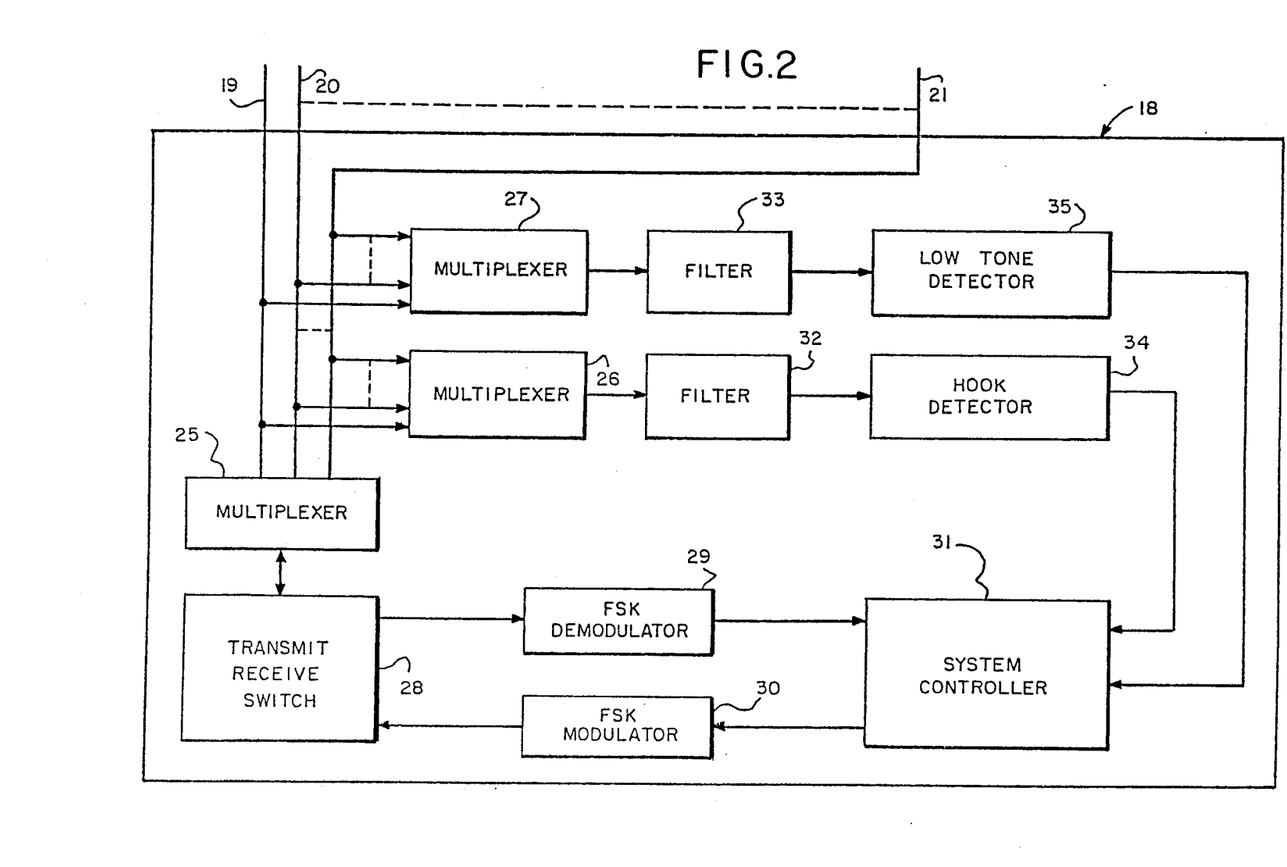
FIG. 2 is a block diagram of a scanner forming part of the embodiment of FIG. 1.

Turning now to FIG. 2, which shows the "innards" of the scanner 18, these include first, second and third multiplexers 25, 26 and 27. These are all time-division multiplexers which, in conventional manner, select the signals on different ones of connections 19, 20 and 21 at different times, and transmit the so-selected signals to their respective outputs. Moreover, multiplexer 25 is a two-way device, which is also capable of distributing selectively, at different times, to the different connections 19, 20 and 21, signals supplied to the other "end" of this multiplexer 25. Thus, either end of multiplexer 25 can serve as input and output, as appropriate. The multiplexer 25 is connected to a transmit-receive switch 28 (also abbreviated as T/R switch). The portion of T/R switch 28 which operates in the receive mode in turn supplies signals from multiplexer 25 to demodulator 29 for frequency-shift keyed (abbreviated as FSK) signals. The portion of T/R switch 28 which operates in the transmit mode receives its input signal (to be transmitted) from a modulator 30 for FSK signals.

In turn, demodulator 29 supplies its output signals to system controller 31, and modulator 30 receives its input signals form the same controller 31.

As for multiplexers 26 and 27, these supply their respective output signals to different filters 32, 33. In turn, filter 32 supplies its output signals to detector 34, while filter 33 supplies its output signals to detector 35. Both of these detectors ultimately supply their output signals to the same system controller 31 which was previously mentioned.

Because of the interlocking relationship between the operations of the various elements of scanner 10 which are shown in FIG. 2, and elements of each STU 22, 23 and 24 (see FIG. 1), it is believed necessary to describe the latter in further detail before dealing more fully with the operational characteristics of either. To that end, reference is now made to FIG. 3, which shows the "innards" of STU 22. It will be understood that all STUs may be substantially identical in construction so that the description of STU 22 presented herein would apply equally to STUs 23 and 24, and to any additional STUs symbolized by the dashed lines between STU 23 and STU 24 in FIG. 1.

This STU 22 (FIG. 3) is connected to line 14, which also connects subscriber handset 11 to the network switch 17 and to scanner 18.

Figure 3:
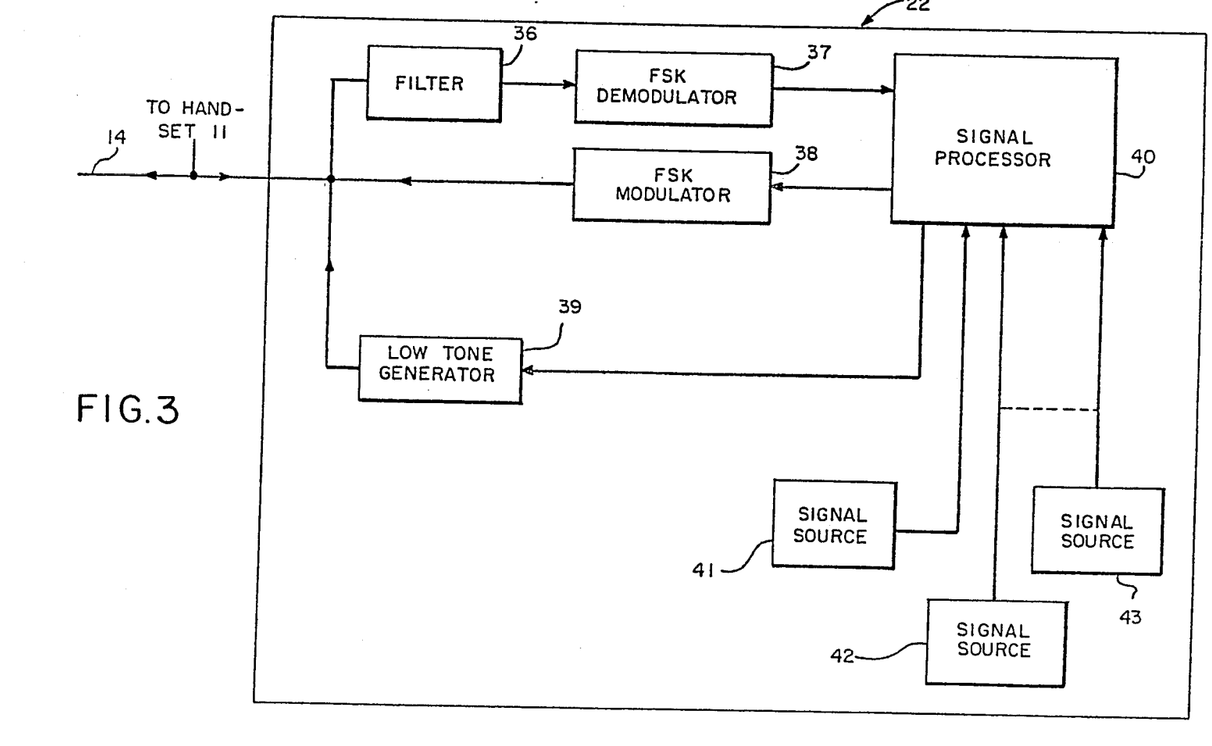
FIG. 3 is a block diagram of a subscriber terminal unit (or STU) forming part of the embodiment of FIG. 1.

Signals received from line 14 are supplied within STU 22 to a filter 36, the output signal from that filter being supplied to a demodulator 37 for frequency-shift keyed signals.

Supplied to line 14 are signals from a modulator 38 for frequency-shift keyed signals.

Also supplied to line 14 are signals from a signal generator 39.

In turn, the output signals from demodulator 37 are supplied to signal processing circuitry 40, and the input signals to modulator 38 and to generator 39 are derived from that same signal processing circuitry 40.

Signal sources 41, 42 and 43 in FIG. 3 represent electrical signal outputs from corresponding instrumentalities (not shown) which are located at the same premises as the STU 22 and handset 11, and which are intended to be under the surveillance of that system which embodies the present invention.

For example, signal source 41 may be a relay which closes and thereby establishes an electrical signal path whenever a fire alarm device at the subscriber's premises senses an alarm condition. By the same token, signal source 42 may be a relay which operates similarly when a burglar alarm is activated, and signal source 43 may function similarly in case of interruptions in a temperature control system.

Proceeding now to the operational characteristics of the elements described above, it is desired to point out first that there is what might be called a "closed-loop" relationship between the scanner 18 and each STU 22, 23 and 24. That is, the scanner produces signals which are transmitted to the STU, which responds thereto to transmit signals back to the scanner, and so on in back-and-forth, or closed-loop relationship.

For description here, let us therefore initially break into the closed loop at that output from system controller 31 which is connected to FSK modulator 30 (FIG. 2). This system controller is constructed so as to recurrently produce at that output FSK modulating signals in a predetermined pattern. This pattern is such that the STUs 22, 23, 24 forming part of the overall system respond to it to provide, in turn, certain output signals as described hereinafter. The FSK modulator 30 responds by producing an FSK-modulated equivalent of the signals from controller 31. The two carrier frequencies used are preferably in the vicinity of 2,700 and 2,900 Hz, i.e. near the upper end of the band of frequencies passed by a typical local telephone line.

These FSK-modulated signals from modulator 30 then pass through T/R switch 28 to multiplexer 25. There, control signals are also applied from system controller 31, in such time coordination with the signals from FSK modulator 30, that the latter are channeled to one or another of connections 19, 20 and 21, depending upon which one of STUs 22, 23 or 24 is the intended destination of these signals from FSK modulator 30 at that time.

Assuming that the intended destination for a particular signal train is STU 22, then multiplexer 25 supplies that train to connection 19, whence it reaches STU 22 via telephone line 14. Note that the same signal train also reaches handset 11 via line 14. More will be said about this later.

Upon reaching STU 22, and referring now to FIG. 3, the signal train described above is demodulated in FSK demodulator 37, after passage through filter 36, which is preferably a band-pass filter constructed to selectively transmit the band of frequencies occupied by the two FSK carrier frequencies (e.g. the 2,700 to 2,900 Hz band). At the output of demodulator 37, there are therefore reconstructed the modulating signals originally provided by controller 31 (FIG. 3). These reconstructed signals are supplied to signal processor 40 within STU 22.

This processor 40 is so constructed as to respond to the above-mentioned signals to generate a train of modulating signals which are in turn supplied to FSK modulator 38, where they produce a corresponding train of FSK-modulated signals, preferably at the same carrier frequencies as those received from scanner 18. This train of FSK-modulated signals returns to that scanner via line 14 and connection 19. In passing, it is noted that this response signal train of course also reaches handset 11.

At the scanner, the multiplexer 25 is activated by controller 31 in time coordination with the expected arrival of this responsive signal train from STU 22 so as to pass signals on connection 19 to the FSK demodulator 29, via the receive portion of T/R switch 28. Demodulator 29 recovers the signals which had been used to modulate the FSK signals at the STU 22 and supplies same to system controller 31.

Reverting now to STU 22 (FIG. 3), the modulating signals produced by signal processor 40 provide information about the state of the signal sources 41, 42 and 43. For example, if at STU 22 there are present no relay closures denoting alarm states of the various instrumentalities under surveillance, then one predetermined pattern of modulating signals is produced by processor 40. If one or more relay closures are present, then correspondingly different patterns are produced, and the (demodulated) signals which ultimately reach the controller 31 from STU 22 are also different. The system controller 31 responds to the paricular pattern of signals received in a particular way. For example, if a pattern of signals is received which indicates that there is an alarm state at signal source 41 of STU 22 (FIG. 3), the system controller 31 provides a corresponding alarm signal to any desired indicator. For example, this may be an indicator at the fire department which is in charge of the subscriber's premises at which the STU 22 is located. Such uses of the signal pattern received from each STU are conventional, in themselves, and may take any of numerous forms, without affecting those aspects of the overall system which constitute the present invention. The means for accomplishing these uses are therefore not further described or illustrated herein.

Attention is now again directed to the fact, previously noted, that the FSK signals passing back and forth between scanner 18 and any given STU also reach the telephone handset with which that STU is associated. This is not a problem, so long as the telephone is on-hook, since these FSK signals remain unnoticed by the subscriber during such on-hook conditions. Not so during off-hook conditions. The FSK signals are within the audible frequency range. They therefore are heard by the subscriber when trying to use the telephone for normal communication purposes. This is quite disturbing, especially since these FSK signals are intentionally caused to recur at frequent intervals, in order to provide indications of the state of the instrumentalities under surveillance which are relatively up-to-date. Moreover, even if the audible effect of these FSK signals were considered acceptable by the subscriber, they would still in many instances contravene telephone company and/or governmental regulations, which prohibit the introduction of such extraneous audible signals into the network during off-hook conditions.

In accordance with the present invention, this matter is dealt with as follows.

The generator 39 which is provided at each STU (FIG. 3) is constructed so as to produce a signal at a frequency substantially below the audible frequency range. For example, this generator 39 may be capable of producing a signal of approximately 25 Hz frequency. It is because of its operation at such a low frequency that generator 39 is referred to as a "low tone" generator.

The generator 39 does not operate continuously. Rather it is controlled by signal processor 40 so as to be in one or the other of two states. So long as the signal sources 41, 42 and 43 are all in their non-alarm state, the signal processor 40 causes the low tone generator 39 to produce its low frequency output signal, which thereupon reaches the scanner 18 via telephone line 14 and connection 19. In contrast, whenever any one or more of signal sources 41, 42 or 43 is in an alarm state, then signal processor 40 causes the low tone generator 39 to stop producing its low frequency output signal. This low frequency signal therefore also ceases to reach scanner 18. As previously indicated, each STU is equipped in substantially similar manner as the STU 22 which is shown specifically in FIG. 3, and operates in substantially the same way.

At that scanner 18, multiplexers 26 and 27 are energized by system controller 31 so as to sequentially sample the signals appearing on connections 19, 20 and 21, respectively.

From multiplexer 26, a signal representing, in recurrent sequence, the hook condition of the different handsets 11, 12 and 13 is derived via filter 32 and hook detector 34, and supplied to system controller 31.

From multiplexer 27, a signal representing, also in recurrent sequence, the presence or absence of the low frequency signals from the different low tone generators of STUs 22, 23 and 24 is derived via filter 33, and supplied to system controller 31.

Observe now what happens during each of four possible siturations prevailing at any given STU, e.g. STU 22 of FIG. 3.

One possible situation is that the telephone handset 11 associated with STU 22 is on-hook, and no alarm condition prevails at STU 22. The on-hook condition is sensed at scanner 18 and the output from FSK modulator 30 is periodically supplied to that STU 22, which responds with a non-alarm output from its FSK modulator 38. This is detected by FSK demodulator 29 and system controller 31 takes no alarm action, but simply continues the periodic sampling of the connection to this STU both for continued on-hook signal and for continued non-alarm FSK signals.

A second possible situation is that the telephone handset 11 is still on-hook, but an alarm condition prevails at STU 22. The on-hook condition is still sensed at scanner 18 and the otput from FSK modulator 30 is still supplied periodically to that STU 22. However, the STU now responds with an alarm signal from its FSK modulator 38. This is detected by FSK demodulator 29, and system controller 31 takes the appropriate alarm action, as previously described.

A third situation is that the telephone handset 11 is off-hook, and that there is no alarm condition at STU 22. This off-hook condition is now sensed at scanner 18, which thereupon does not supply output signals from FSK modulator 30 to STU 22 for the duration of this third situation, provided the scanner 18 also senses a low tone signal received from the same STU. It will also be recalled that a low tone from generator 39 is produced when no alarm condition prevails.

The fourth situation is that the telephone handset 11 is again off-hook, but that there is at least one alarm conditio at STU 22. The off-hook condition at STU 22 is again sensed at scanner 18, but so is the absence of the low tone signal from that same STU. Under these circumstances, the scanner 18 does supply output signals from FSK modulator 30 to STU 22, of the same type as it would have supplied had the handset 11 been on-hook, rather than off-hook. This will, of course, cause a reply from STU 22, in the form of FSK modulated signals from its modulator 38, which will in turn be detected at scanner 18, and used to produce the desired alarm response.

It will now be recognized that, so long as there is no alarm condition at the STU, there will be no signal in the audible range from the operation of the present invention while the associated handset is in use by the subscriber. This satisfies the subscriber's desires and also complies with regulations. On the other hand, when there is an alarm condition, there will be such audible signals, even when the handset is in use, in the form of the FSK modulated signals travelling back and forth between scanner locations and subscriber premises. However, during alarm conditions, the presence of such audible signals is not only permitted by regulations, but is also affirmatively desirable from the subscriber's standpoint, since it provides prompt warning to the subscriber that an alarm condition has arisen.

It will also be understood that, by means of the multiplexers 25, 26 and 27 in scanner 18 (FIG. 2), the same treatment which is accorded to STU 22 is also accorded to STUs 23 and 24, in recurring sequence. That is, first the scanner 18 is connected so that it interacts with STU 22 in the manner described above, then it is connected with STU 23 for the equivalent purpose, then with STU 24, and so forth in recurring sequence.

Moreover, if there are more than three STUs—which will normally be the case in any practical application—these are all treated in recurrent sequence in the manner described above for the single STU 22.

Figure 4:
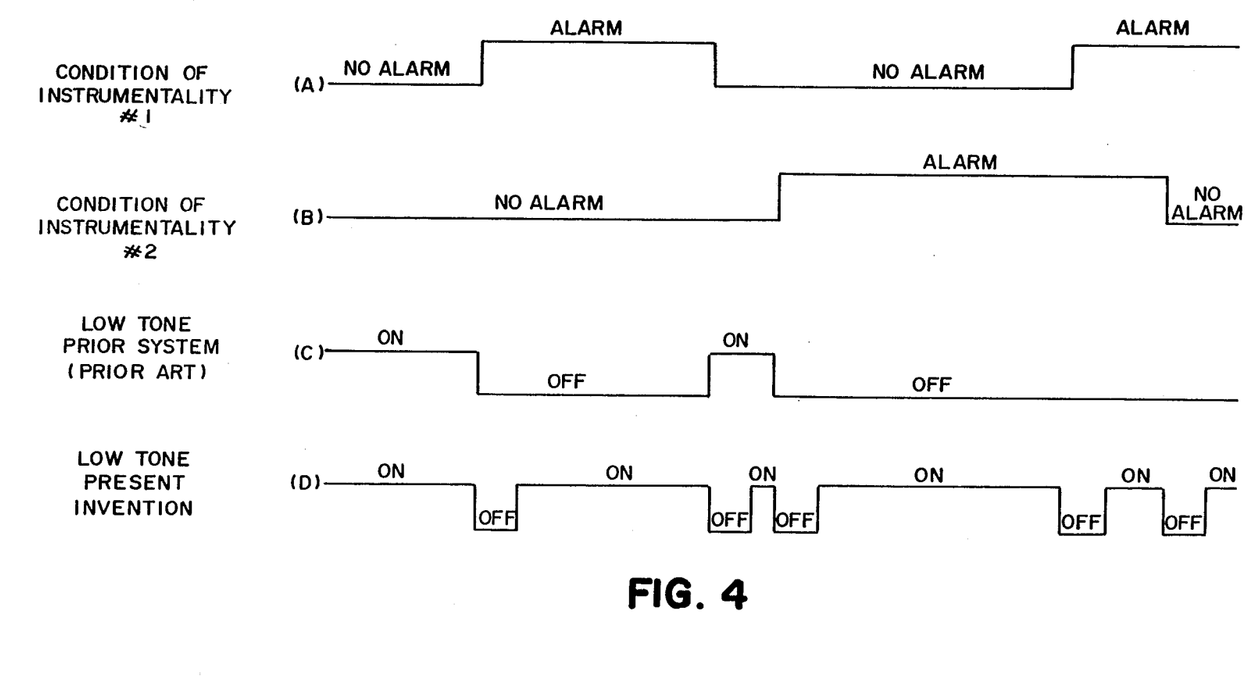
FIG. 4 is a waveform diagram useful in understanding the operation of the present invention.

Up to this point, the system description of the present invention corresponds to the system description in U.S. Pat. No. 4,442,320. Wavesforms (A), (B) and (C) in FIG. 4 depict the operation of the low tone signal in the prior system. As seen, the low tone signal, represented by waveform (C), is transmitted when all of the instrumentalities represented by signal sources 41, 42 and 43 are in the "no alarm" condition and is discontinued when at least one of the instrumentalities is in the "alarm" condition. As a result, interrogation signals are transmitted from scanner 18 to the STU or STU's which have signalled an alarm condition by the loss of the low tone signal for the entire "OFF" interval which corresponds to the entire "alarm" interval.

In contrast, the present invention limits the low tone signal "OFF" interval. This is shown by waveform (D) in FIG. 4. After interruption of the low tone signal and interrogation by scanner 18 to identify the particular alarm at the particular instrumentality, the scanner supplies an output signal which resets low tone generator 39 to supply the low tone signal. Only when an instrumentality connected to the particular STU changes its state from the last one reported to the scanner is there an interruption in the low tone signal. This may occur when another instrumentality connected to the same STU changes to an "alarm" condition or when the instrumentality which changed to an "alarm" condition returns to its initial "no alarm" state. The former is represented by the third "OFF" pulse in waveform (D), while the latter is represented by the second "OFF" pulse in waveform (D).

The foregoing is accomplished by arranging signal processor 40 (FIG. 3) to supply a control signal to turn off low tone generator 39 whenever the state of any instrumentality connected to the signal processor changes. Scanner 18 senses the loss of the low tone signal and interrogates the STU to identify the basis for the loss of the low tone signal. Once this is determined, the scanner supplies a control signal which causes signal processor 40 to turn on low tone generator 39.

A number of additional observations about the present invention are believed to be in order.

A particularly "happy" combination of interacting features is believed to be provided by relying primarily upon the high-frequency end of the audible range for on-hook alarm reporting purposes, while relying upon a sub-audible signal for initial off-hook alarm reporting purposes.

Use of the high-frequency end makes a relatively high data rate possible, which means that relatively detailed information about the instrumentalities under surveillance can be obtained, and also that this can be repeated frequently, and relatively many STUs can be accommodated by the system. Use of the sub-audio end makes it possible to speak without interference during the (presumably overwhelming) majority of the times when no alarm is present. Yet, by shifting from sub-audio to high frequency, the desired detailed information can be obtained when needed, i.e. when an alarm condition arises, even during off-hook periods.

It will also be noted that low tone provides redundancy for the alarm function of the system during on-hook conditions. During that condition, low tone continues to be transmitted from each STU to the scanner, so long as no alarm is present at the STU. Any low tone interruption during on-hook conditions is also sensed by the scanner, and provides what might be called a "coarse" back-up alarm indication for the more detailed one which is normally provided by the FSK-modulated reply from the STU.

Moreover, the alarm indication during off-hook periods is fail-safe, since it is the disappearance of the low tone signal which indicates an alarm condition. Thus, failure of equipment in the STU will cause a pseudo-alarm indication conducive to prompt correction.

In a preferred embodiment of the invention, there is one other occasion, in addition to that described above, when a particular STU has the FSK modulated signal train from scanner 18 transmitted to it, even though it is not that STUs regular turn, in recurrent sequence.

That occasion is the return from off-hook to on-hook status of its associated telephone handset.

It will be recalled that the hook status is detected for each STU at the scanner 18. When a change from off-hook to on-hook status is thus detected, the STU at that subscriber's premises is preferably made the next one to receive the FSK-modulated signal from the scanner, and therefore also the next one to provide its FSK modulated reply. The reason for this is that only non-detailed information about the status of the instrumentalities at that location had been available during the preceding off-hook period, and it is deemed desirable to up-date this without delay once the off-hook condition no longer prevails.

Another highly desirable feature of the invention is that the individual components of the overall system can take any one of a number of known forms.

Thus, all of the elements of the scanner 18 (FIG. 2) may be of known form, and so may all the elements of the STU 22 (FIG. 3).

Considering first the scanner 18, it will be recognized that the multiplexers 25, 26 and 27 may be of known construction. The filters 32 and 33 may be of known form, suitable for selecting the particular frequencies desired to be passed on to the hook detector 34 and low tone detector 35, respectively. These detectors, themselves, may also be of known form, the hook detector 34 being a conventional part of telephone systems, and the low tone detector 35 being a detector of the presence of absence of the 25 Hz low tone signal. The T/R switch 28 may be of known forms, and the system controller 31 may include any known circuitry capable of providing the straightforward sensing and responsive control functions which have been described. Thus, system controller 81 may comprise a conventional source of timing signals, from which are derived the sequential operating signals for the multiplexers 25, 26 and 27. Also driven by signals derived from the timing signals may be sources, such as shift registers, of the trains of modulating signals for FSK modulator 30. AND gate circuitry may be used to detect the simultaneous presence of off-hook detected signals and low tone detected signals. Such detection is used by conventional circuitry to inhibit signals to the FSK modulator 30. Conversely, the non-detection of these simultaneous signals causes the transmission of such signals to the FSK modulator.

Considering next the STU 22, the FSK demodulator 37 and the FSK modulator 38 may again be of any known form, as also the filter 36 which precedes the demodulator 37. The low tone generator may also be of any known form capable of producing the desired 25 Hz signals when energized. The signal sources may be simple relay circuits operated by the respective alarms, and the signal processor may be any known form of digital logic, or of microprocessor circuitry programmed in conventional manner to elicit the appropriate timed signal responses, as previously described.

The telephone system itself is completely unaffected by the invention. No added filtering is required in the telephone system; in particular there is no leakage of low tone signals from one side of the network switch 17 to the other because the network switch contains adequate filtering for other reasons, namely to isolate different levels of DC on opposite sides of the switch.

When the system embodying the present invention is used, not to signal an alarm, as such, but rather other states of equipment at a telephone subscriber's premises, such as meter readings, meteorological measurements, etc., then low tone may be used to indicate that all the measuring instruments are continuing to work, even while the telephone handset is off-hook. During on-hook periods, the signals from any given STU can then supply the more detailed data desired concerning the equipment.

It will be understood that various modifications will occur to those skilled in the art without departing from the invention concept, whose scope it is desired to define only by the appended claims.

We claim:

1. A system for providing communication between a central location and instrumentalities other than a conventional telephone located at the premises of telephone network subscribers, comprising:

means for selectively transmitting interrogation signals from the central location to the telephones at different ones of said subscriber premises;

means located at said premises and connected to said telephones and responsive to said transmitted signals to retransmit to the central location from the respective subscriber premises response signals in the audible telephone frequency range and of characteristics indicative of the state of said instrumentalities;

means at the central location for sensing the off-hook state of the conventional telephone at a given subscriber's premises and responding thereto to inhibit the transmitting of said interrogation signals from the central location to that same premises;

means for transmitting to the central location a signal at a frequency below the audible range from each of the premises when the instrumentalities at the given subscriber premises are in one predetermined state;

means responsive to at least one instrumentality being in another predetermined state to interrupt the transmission of said below-audible-range signal;

means at the central location for sensing interruption of said below-audible-range signal and for resuming transmission of said interrogation signals to the premises from which said below-audible-range signal transmission was interrupted during an off-hook state of the telephone at said same pemises;

and means at the central location for causing transmission of said interrupted below-audible-range signal to resume after receipt at said central location of response signals transmitted from said same premises in response to said resumption of interrogation signals, even though said instrumentality which caused interruption of transmission of said below-audible-range signal remains in said another predetermined state.

2. The system of claim 1 wherein the below-audible-range signal is transmitted from any given premises at least during off-hook conditions of the telephone at the same premises.

3. The system of claim 1 wherein the below-audible-range signal is transmitted from any given premises both during on-hook and off-hook conditions of the telephone at the same premises.

4. The system of claim 1 wherein the interrogation signals transmitted from the central location are FSK modulated signals in the upper portion of the audible range.

5. The system of claim 4 wherein the response signals retransmitted from the subscriber premises are also FSK modulated signals in the upper portion of the audible range.

6. The system of claim 5 wherein the FSK carrier frequencies are in the vicinity of 2700 and 2900 Hz.

7. The system of claim 1 wherein the below-audible-range signal is at a frequency of approximately 25 Hz.

8. The system of claim 1 wherein individual wire connections are provided at the central location to each subscriber local loop; and multiplexing means are provided for applying the transmitted interrogation signals selectively to different ones of said individual connections in predetermined sequence, and for selectively receiving the response signals from the same said individual connections in the same said predetermined sequence.

9. The system of claim 8 further comprising
means for sensing the discontinuance of the off-hook condition at any selected subscriber telephone; and
means responsive thereto to transmit the interrogation signals from the central location to the same selected premises.

10. A system for signalling, through a telephone network, the condition of an instrumentality located at the premises of subscribers to said telephone network, said system comprising:
(a) a scanner connected to said telephone network at a central location and having:
  (1) means for selectively transmitting, through said telephone network, interrogation signals in the audible telephone frequency range to a plurality of terminals connected to a plurality of telephones in said network;
  (2) means for receiving, through said telephone network, response signals in the audible telephone frequency from said terminals;
  (3) means for sensing the off-hook state of a telephone at a given subscriber's premises and in response thereto for inhibitting transmission of said interrogation signals to that same premises;
  (4) means for sensing the presence and absence of low-tone signals transmitted from said terminals at a frequency below the audible range;
  (5) means responsive to said low-tone signal sensing means for resuming transmission of said interrogation signals to the premises from which a low-tone signal transmission was interrupted during an off-hook state of the telephone at said same premises; and
  (6) means for supplying a control signal to said same premises after receipt of response signals transmitted from said same premises in response to said resumption of interrogation signals;
(b) and a plurality of terminals connected to a plurality of telephones in said network, each terminal connected to a telephone and having:
  (1) means for receiving, from an instrumentality at the premises of the telephone to which said terminal is connected, condition signals representative of the condition of said instrumentality;
  (2) means responsive to said interrogation signals and said condition signals for transmitting, through said telephone network, response signals in the audible telephone frequency range and of characteristics indicative of the state of said instrumentality; and
  (3) means responsive to: (a) said condition signals for transmitting, through said telephone network, a low-tone signal at a frequency below the audible range when said instrumentality is in a predetermined condition and for interrupting transmission of said low-tone signal when said instrumentality changes to a second condition; (b) and said control signal for resuming transmission of said low-tone signal even though said instrumentality which caused interruption of transmission of said low-tone signal remains in said another predetermined state.

11. A system according to claim 10 wherein the interrogation signals are FSK modulated signals in the upper portion of the audible range.

12. A system according to claim 11 wherein the response signals also are FSK modulated signals in the upper portion of the audible range.

13. A system according to claim 12 wherein the FSK carrier frequencies are in the vicinity of 2700 and 2900 HZ.

14. A system according to claim 10 wherein the low-tone signal is at a frequency substantially below the audible frequency range.

15. A system according to claim 14 wherein the low-tone signal is at a frequency of approximately 25 Hz.

16. A system for signalling; through a telephone network, the condition of one or more instrumentalities located at the premises of subscribers to said telephone network, said system comprising:
(a) a scanner connected to said telephone network at a central location and having:
  (1) means for selectively transmitting, through said telephone network, interrogation signals in the audible telephone frequency range to a plurality of terminals connected to a plurality of telephones in said network;
  (2) means for receiving, through said telephone network, response signals in the audible telephone frequency from said terminals;
  (3) means for sensing the off-hook state of a telephone at a given subscriber's premises and in response thereto for inhibitting transmission of said interrogation signals to that same premises;
  (4) means for sensing the presence and absence of low-tone signals transmitted from said terminals at a frequency below the audible range;
  (5) means responsive to said low-tone signal sensing means for resuming transmission of said interrogation signals to the premises from which a low-tone signal transmission was interrupted during an off-hook state of the telephone at said same premises; and
  (6) means for supplying a control signal to said same premises after receipt of response signals transmitted from said same premises in response to said resumption of interrogation signals;
(b) and a plurality of terminals connected to a plurality of telephones in said network, each terminal connected to a telephone and having:
  (1) means for receiving, from one or more instrumentalities at the premises of the telephone to which said terminal is connected, condition signals representative of the conditions of said instrumentalities;
  (2) means responsive to said interrogation signals and said condition signals for transmitting, through said telephone network, response signals in the audible telephone frequency range and of characteristics indicative of the states of said instrumentalities; and
  (3) means responsive to: (a) said condition signals for transmitting, through said telephone network, a low-tone signal at a frequency below the audible range when said instrumentalities are in a predetermined condition and for interrupting transmission of said low-tone signal when at least one of said instrumentalities changes to a second condition; (b) and said control signal for resuming transmission of said low-tone signal even though said instrumentality which caused interruption of transmission of said low-tone signal remains in said another predetermined state.

17. A terminal for signalling through a telephone system the condition of an instrumentality, said terminal comprising:
means for receiving, from an instrumentality, condition signals representative of the condition of said instrumentality;
means for receiving, through a telephone system, interrogation signals from a central location;
means responsive to said interrogation signals and said condition signals for transmitting, through said telephone system, response signals in the audible telephone frequency range and representative of the condition of said instrumentality;
means for receiving, through said telephone system, control signals representative of the receipt at said central location of response signals after said instrumentality has changed from a first predetermined condition to a second predetermined condition;
and means responsive to: (a) said condition signals for transmitting, through said telephone system, a low-tone signal at a frequency below the audible range when said instrumentality is in said first predetermined condition and for interrupting transmission of said low-tone signal when said instrumentality changes to said second condition; (b) and said control signals for resuming transmission of said low-tone signal even though said instrumentality which caused interruption of transmission of said low-tone signal remains in said second predetermined condition.

18. A terminal according to claim 17 wherein the interrogation signals are FSK modulated signals in the upper portion of the audible range.

19. A terminal according to claim 18 wherein the response signals are also FSK modulated signals in the upper portion of the audible range.

20. A terminal according to claim 19 wherein the FSK carrier frequencies are in the vicinity of 2700 and 2900 Hz.

21. A terminal according to claim 17 wherein the low-tone signal is at a frequency substantially below the audible frequency range.

22. A terminal according to claim 21 wherein the low-tone signal is at a frequency of approximately 25 Hz.

23. A terminal for signalling through a telephone system the condition of a plurality of instrumentalities, said terminal comprising:
means for receiving, from a plurality of instrumentalities, a plurality of condition signals representative of the conditions of said instrumentalities;
means for receiving, through a telephone system, interrogation signals from a central location;
means responsive to said interrogation signals and said condition signals for transmitting, through said telephone system, response signals in the audible telephone frequency range and representative of the conditions of said instrumentalities;
means for receiving, through said telephone system, control signals representative of the receipt at said central location of response signals after said instrumentalities have changed from a first predetermined condition to a second predetermined condition;
and means responsive to: (a) said condition signals for transmitting, through said telephone system, a low-tone signal at a frequency below the audible range when said instrumentalities are in a predetermined condition and for interrupting transmission of said low-tone signal when one of said instrumentalities changes to said second predetermined condition; (b) and said control signals for resuming transmission of said low-tone signal even though said instrumentality which caused interruption of transmission of said low-tone signal remains in said second predetermined condition.

* * * * *